(12) United States Patent  (10) Patent No.: US 8,473,173 B1
Robles  (45) Date of Patent: Jun. 25, 2013

(54) MOTION SENSOR BRAKING SYSTEM AND ASSOCIATED METHOD

(76) Inventor: William Robles, Brooklyn, NY (US)

( * ) Notice: Subject to any disclaimer, the term of this patent is extended or adjusted under 35 U.S.C. 154(b) by 744 days.

(21) Appl. No.: 12/555,387

(22) Filed: Sep. 8, 2009

Related U.S. Application Data

(60) Provisional application No. 61/191,377, filed on Sep. 8, 2008.

(51) Int. Cl.
*G08G 1/16* (2006.01)
*G01S 13/00* (2006.01)

(52) U.S. Cl.
USPC ............. 701/70; 340/435; 340/436; 340/903; 340/904; 342/70; 342/71; 342/72

(58) Field of Classification Search
USPC .. 701/70; 340/435, 436, 903, 904; 342/70–72
See application file for complete search history.

(56) References Cited

U.S. PATENT DOCUMENTS

| 4,353,601 | A | * | 10/1982 | Jones | 303/161 |
| 5,598,164 | A | * | 1/1997 | Reppas et al. | 342/70 |
| 6,264,286 | B1 | * | 7/2001 | Ehrlich et al. | 303/7 |

* cited by examiner

*Primary Examiner* — Thomas Tarcza
*Assistant Examiner* — Adam Tissot (57) ABSTRACT

An automatic vehicle braking system prohibits vehicle propulsion upon detection of a triggering event, and includes sensors that detect the triggering event, a processor. A logic gate and a vehicle gear sensor cooperate with the processor to automatically activate and deactivate a vehicle braking system, which includes a solenoid switch responsive to an output signal from the logic gate. An air valve is activates the vehicle braking system by permitting air to pass downstream of the air valve and to existing vehicle brake pads. An outlet port is situated downstream from the inlet port of the air valve casing. A piston is linearly reciprocated within the casing such that the inlet port is in fluid communication with the existing air tank of the vehicle. In this manner, the outlet port may be adapted to be in fluid communication with an existing brake pad of the vehicle braking system.

12 Claims, 5 Drawing Sheets

MOTION SENSOR BRAKING SYSTEM AND ASSOCIATED METHOD

CROSS REFERENCE TO RELATED APPLICATIONS

This application claims the benefit of U.S. Provisional Application No. 61/191,377, filed Sep. 8, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vehicle braking and, more particularly, to a motion sensor braking system and associated method for alerting and assisting vehicle operators of foreign objects located under and in front of the vehicle.

2. Prior Art

Among the unsung, unheralded occupations, that of school bus driver is one of the most important. Bus drivers deliver our children to and from school, and our children's' lives are in their hands. School bus driving is an incredibly challenging job. We all know how a few children can be distracting, but imagine how distracting 40 children could be. Bus drivers must supervise 40 children while operating a vehicle the size of a medium-bodied truck. Bus drivers also have the added complication of monitoring children as they exit the bus and cross the road.

Unfortunately, bus drivers are only human, and as such they can make mistakes. One difficulty the bus driver faces is the consequence of the size of the vehicle and its restricted field of view. Because the driver cannot see directly in front or underneath of the bus, it sometimes happens that a child is caught beneath the bus and run over. Children are sometimes careless and it is possible for a child to wander under the bus in pursuit of an item that was dropped, or for rough-housing to result in a child falling or being pushed under the vehicle. Even if a bus driver realizes that there is an object under, behind, or in front of the vehicle, human reaction time may be too great to avoid an accident.

Accordingly, a need remains for a motion sensor braking system in order to overcome the above-noted shortcomings. The present invention satisfies such a need by providing a system that is convenient and easy to use, is durable yet lightweight in design, is versatile in its applications, and provides users with a safe and efficient means of detecting foreign objects under or in front of their vehicle therefore reducing the risk of tragic accidents.

BRIEF SUMMARY OF THE INVENTION

In view of the foregoing background, it is therefore an object of the present invention to provide an automatic vehicle braking system that prohibits a vehicle from being propelled during low gear/low speed operating conditions, upon detecting a triggering event. These and other objects, features, and advantages of the invention are provided by an automatic vehicle braking system for prohibiting vehicle propulsion upon detection of a triggering event adjacent to a vehicle. The automatic vehicle braking system preferably includes a plurality of sensors adapted to be attached to alternate positions of the vehicle. Each sensor generates and transmits an object signal upon detecting the triggering event.

A processor may be electrically coupled directly to the sensors. A memory may be electrically coupled directly to the processor. Such a memory preferably includes software instructions that cause the processor to generate a first input signal upon receiving the object signals from the sensors.

A logic gate may be electrically coupled directly to the processor and a vehicle gear sensor may be electrically coupled directly to the logic gate. In this manner, the vehicle gear sensor preferably generates and transmits a second input signal upon detecting a real-time gear level of the vehicle. A vehicle braking system may be electrically coupled directly to the logic gate and may be responsive thereto.

Advantageously, the logic gate automatically generates an output signal upon receiving the first and second input signals respectively. Such an output signal controls an operating mode of the vehicle braking system. As one example, the first input signal is true when at least one of the object signals is true. Alternately, the first input signal is false when both of the object signals are false. In this manner, the second input signal is true and false when the real-time gear level of the vehicle is below and above a maximum threshold gear level.

In one embodiment, the output signal is true when each of the first and second input signals are true. Alternately, the output signal is false when at least one of the first and second input signals is false. In this manner, the vehicle braking system is automatically toggled between activated and deactivated positions when the output signal is true and false respectively.

In one embodiment, the present invention may further include a user interface communicatively coupled to the processor for manually causing the processor to emit the true or false output signal as desired by the user.

In one embodiment, the present invention may include a vehicle data recorder communicatively coupled to the vehicle gear sensor and the processor for recording the first and second input signals during the triggering event.

Notably, the vehicle braking system preferably includes a solenoid switch responsive to the output signal from the logic gate. An air valve is communicatively coupled to the solenoid switch and responsive thereto such that the air valve activates the vehicle braking system by permitting air to pass downstream of the air valve and to existing vehicle brake pads. In one embodiment, the air valve preferably includes a casing having an inlet port and an outlet port situated downstream from the inlet port. A piston may be linearly reciprocated within the casing such that the inlet port is adapted to be in fluid communication with the existing air tank of the vehicle. In this manner, the outlet port may be adapted to be in fluid communication with an existing brake pad of the vehicle braking system.

The piston may have a linear notch formed therein. Such a notch may be linearly reciprocated along a linear path within the casing such that the notch becomes selectively isolated and accessible to the outlet port when the vehicle braking system is deactivated and activated respectively.

In one embodiment, the air valve is a direct air valve independently operable from the existing brake pedal of the vehicle.

In one embodiment, the air valve is a bypass air valve preferably including a second inlet port in fluid communication with the casing and operably coupled to the existing brake pedal of the vehicle such that air is prohibited and permitted to enter the casing when the piston is at a fully displaced and a fully retracted position within the casing respectively. In this manner, the piston isolates the second inlet port from the outlet port when the piston is fully displaced within the casing such that the vehicle braking system automatically overrides a user input at the existing brake pedal.

The present invention further includes a method of utilizing an automatic vehicle braking system for prohibiting vehicle propulsion upon detection of a triggering event adjacent to a vehicle. Such a method preferably includes the chronological steps of: providing and attaching a plurality of sensors adapted to alternate positions of the vehicle; each of the sensors generating and transmitting an object signal upon detecting the triggering event; providing and electrically coupling a processor directly to the sensors; and providing and electrically coupling a memory directly to the processor, wherein the memory including software instructions causing the processor to generate a first input signal upon receiving the object signals from the sensors.

The method may further include the chronological steps of: providing and electrically coupling a logic gate directly to the processor; providing and electrically coupling a vehicle braking sensor directly to the logic gate; the vehicle gear sensor generating and transmitting a second input signal upon detecting a real-time gear level of the vehicle; providing and electrically coupling a vehicle braking system directly to the logic gate and being responsive thereto; the logic gate automatically generating an output signal upon receiving the first and second input signals respectively; and the output signal controlling an operating mode of the vehicle braking system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-7 by the reference numeral 10 and is intended to provide an automatic vehicle braking system for prohibiting vehicle propulsion during low gear/low speed travel. It should be understood that the automatic vehicle braking system 10 may be used with many different types of vehicle such as multi-passenger vehicles and semi-tractors, for example.

The motion sensor braking system 10 of the present invention provides two features for vehicle operation that will help save children's lives. First, the system 10 allows for early detection of a child who has moved in front, behind, or beneath the vehicle 11. Secondly the system 10 instantaneously applies the brakes when a foreign object in front of, behind, or beneath the vehicle 11 has been detected, drastically cutting down the driver's reaction time.

Figure 1:
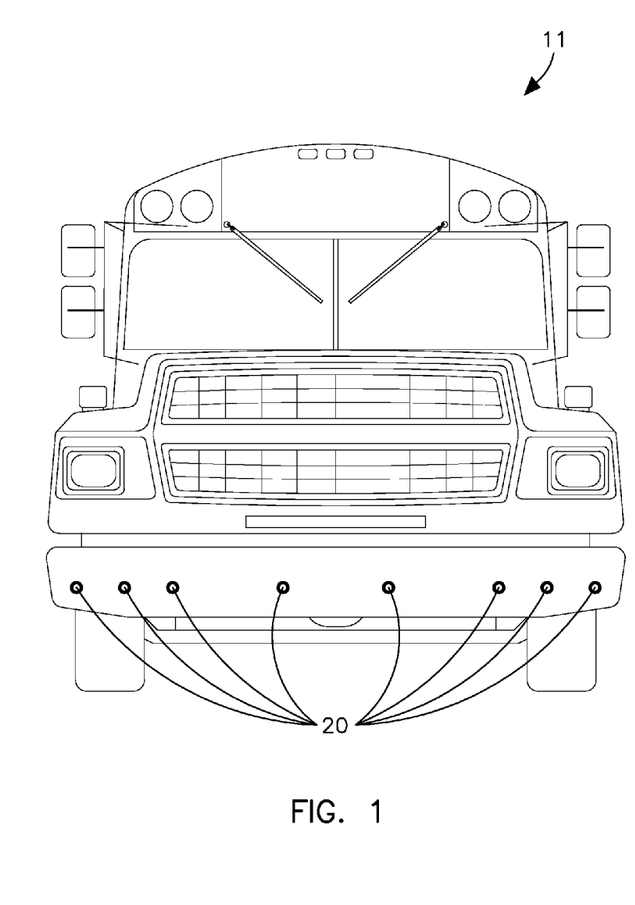
FIGS. 1-3 are front and side elevation views showing alternate locations for the object sensors, in accordance with the present invention.
Figure 2:
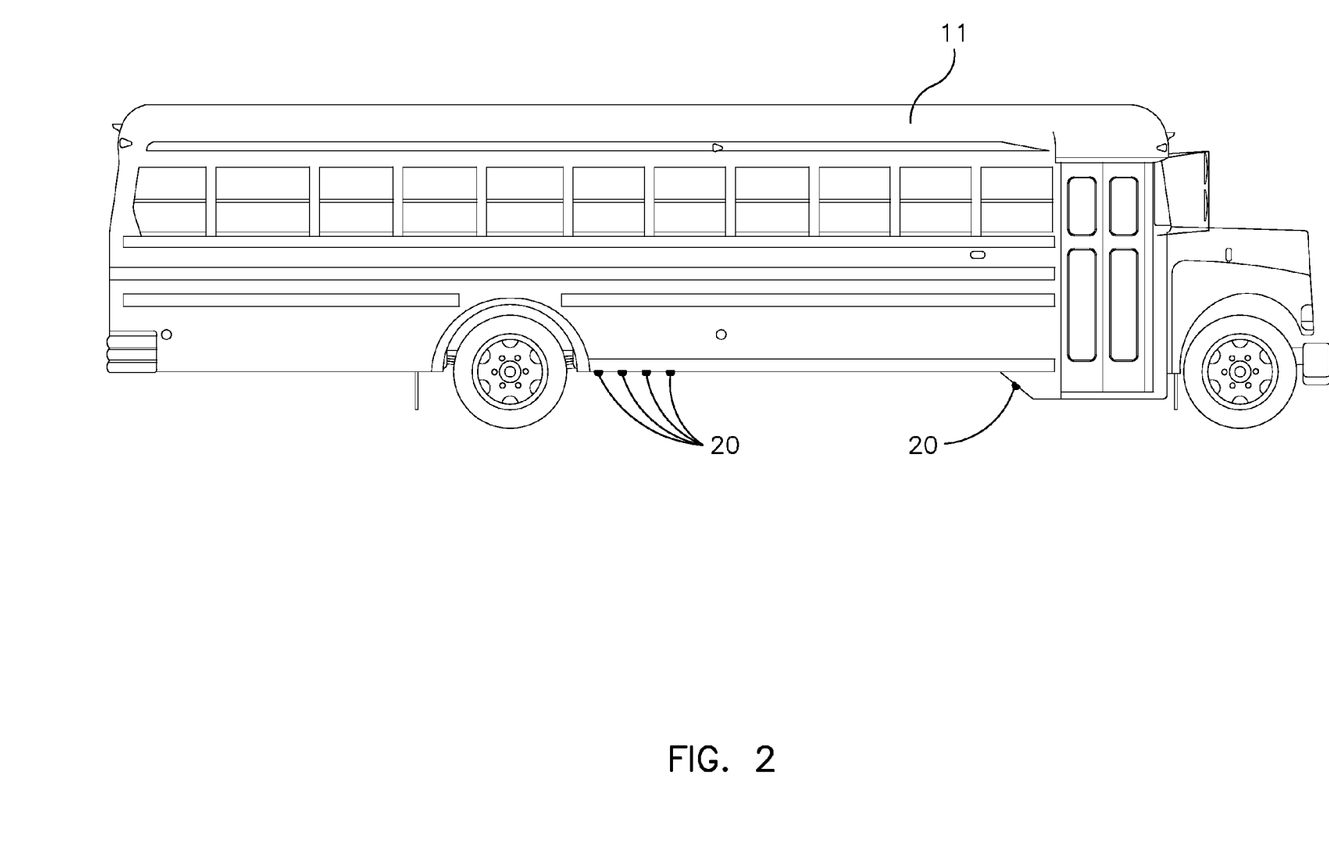
Figure 3:
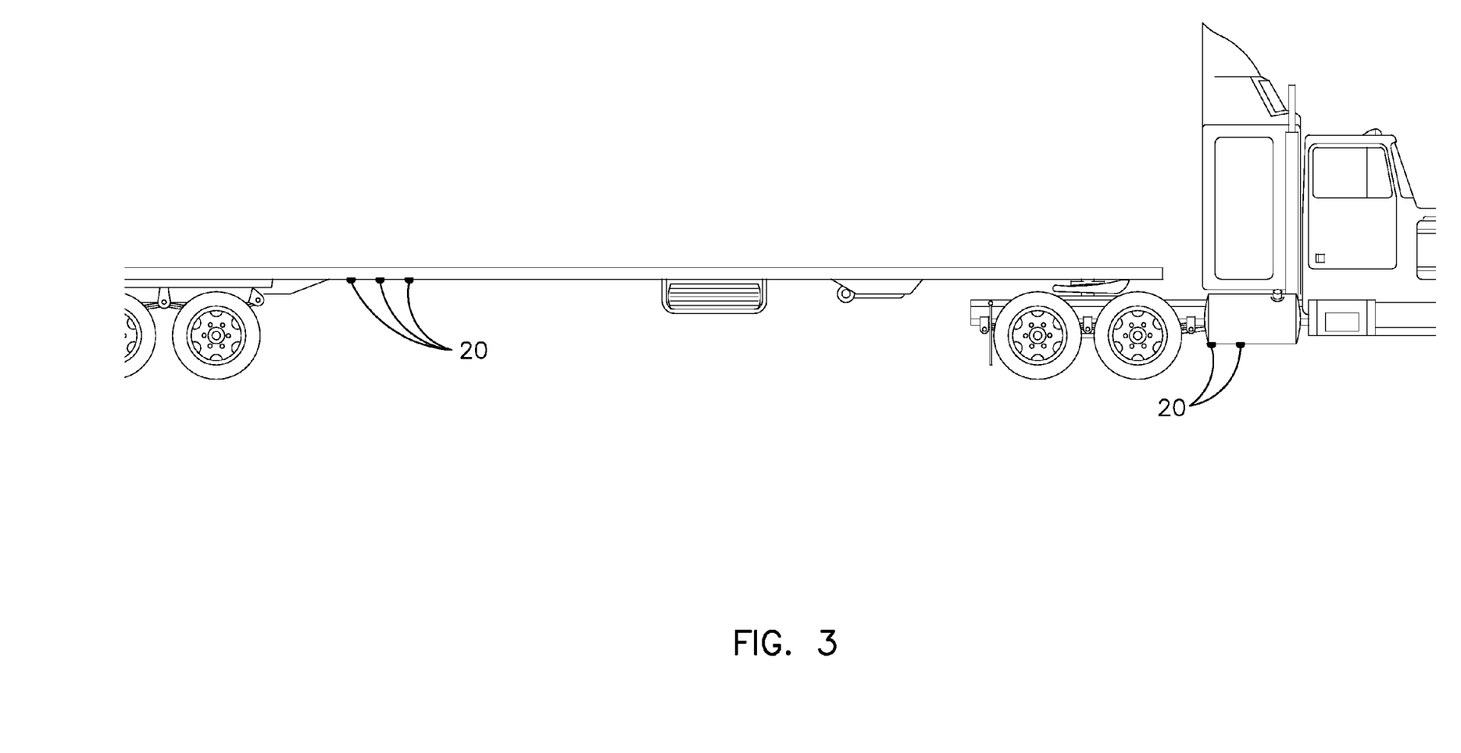

In accordance with a preferred embodiment of the present invention, the automatic vehicle braking system 10 preferably includes a plurality of sensors 20 adapted to be attached to alternate positions of the vehicle 11. Each sensor 20 generates and transmits an object signal upon detecting the triggering event.

Figure 7:
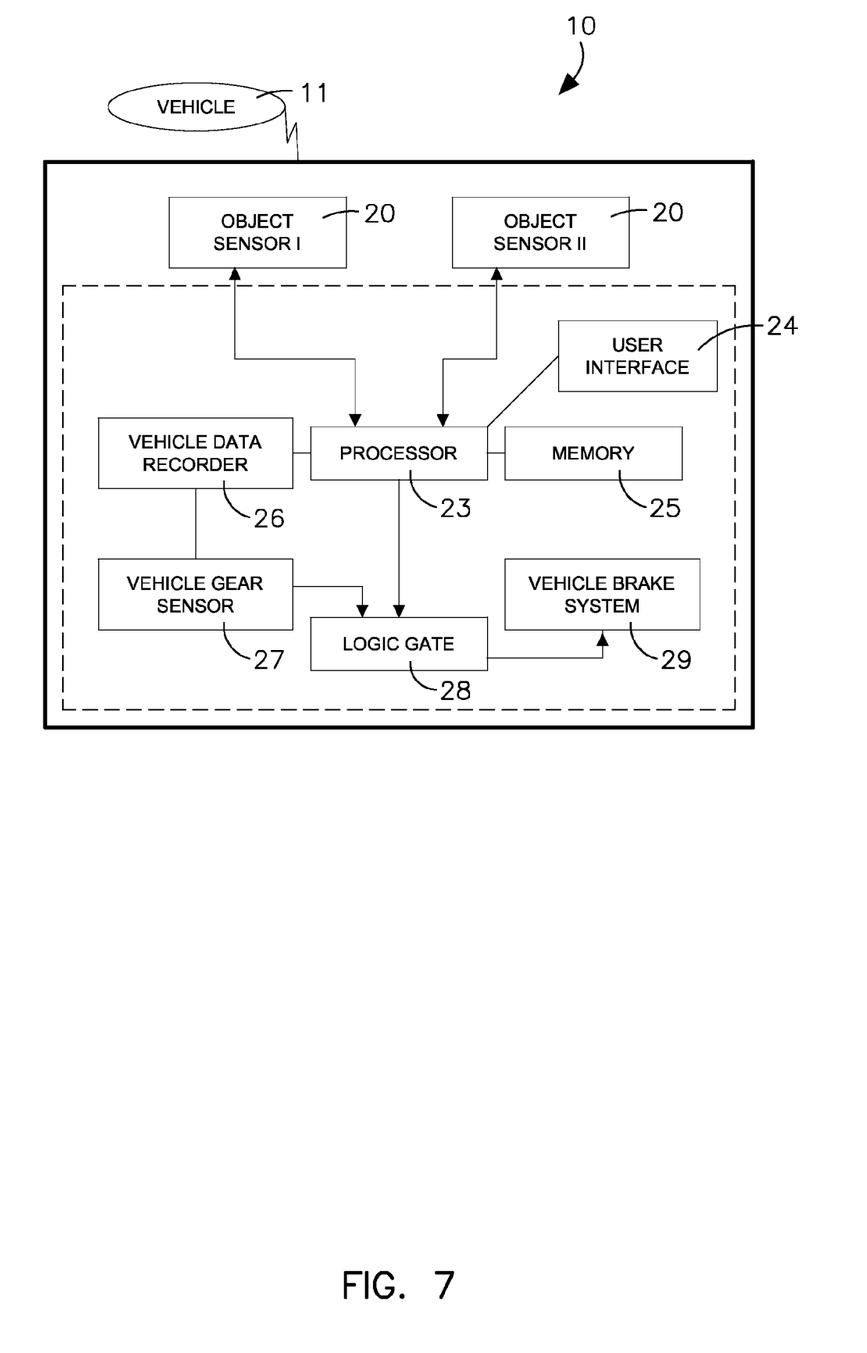
FIG. 7 is a high-level schematic block diagram illustrating the interrelationship between the major electronic components of the present invention.

A processor 23 may be electrically coupled directly to the sensors 20. A memory 25 may be electrically coupled directly to the processor 23. Such a memory 25 preferably includes software instructions that cause the processor 23 to generate a first input signal upon receiving the object signals from the sensors 20. Such combination of such claimed elements solved the problem of inadvertently accepting any and all object signals from the sensors 20, which is a shortcoming with prior art attempts to locate objects such as pedestrians around the vehicle. One skilled in the art understands conventional software program language may be employed to execute a control logic algorithm that detects a minimum height and width of the object so that it can be validated by the processor 23.

A logic gate 28 may be electrically coupled directly to the processor 23 and a vehicle gear sensor 27 may be electrically coupled directly to the logic gate 28. In this manner, the vehicle gear sensor 27 preferably generates and transmits a second input signal upon detecting a real-time gear level of the vehicle 11. A vehicle braking system 29 may be electrically coupled directly to the logic gate 28 and may be responsive thereto. By verifying both the low gear of the vehicle 11 and the dimensions of the detected object, the present invention solves the problem of incorrectly activating and deactivating the vehicle brake system 29, when such conditions have not been met. For example, if the vehicle is traveling at a high gear, such as $3^{rd}$ or $4^{th}$ gear, the brake system 29 will not be activated even when an object is located around the vehicle 11 because it would be dangerous to immediately stop the vehicle 11 at high speeds.

Advantageously, the logic gate 28 automatically generates an output signal upon receiving the first and second input signals respectively. Such an output signal controls an operating mode of the vehicle braking system 29. As one example, the first input signal is true when at least one of the object signals is true. Alternately, the first input signal is false when both of the object signals are false. In this manner, the second input signal is true and false when the real-time gear level of the vehicle 11 is below and above a maximum threshold gear level. The maximum threshold gear level may be $2^{nd}$ second gear, for example. The combination of such claimed elements provides an unpredictable and unexpected result which is not rendered obvious by one skilled in the art because prior art attempts do not consider the combination of the vehicle gear along with the detected object's dimensions before making a decision to activate/deactivate the brake system 29.

In one embodiment, the output signal is true when each of the first and second input signals are true. Alternately, the output signal is false when at least one of the first and second input signals is false. In this manner, the vehicle braking system 29 is automatically toggled between activated and deactivated positions when the output signal is true and false respectively.

In one embodiment, the present invention may further include a user interface 24 communicatively coupled to the processor 23 for manually causing the processor 23 to emit the true or false output signal as desired by the user.

In one embodiment, the present invention may include a vehicle data recorder 26 communicatively coupled to the vehicle gear sensor 27 and the processor 23 for recording the first and second input signals during the triggering event (upon detecting an object adjacent to the vehicle 11).

Figure 4:
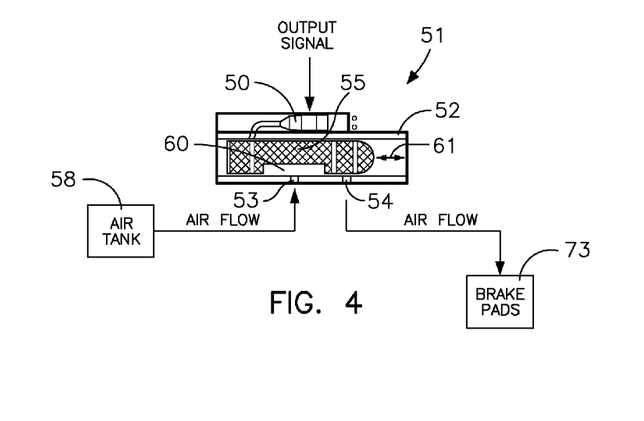
FIG. 4 is a side elevation view of an air valve employed by one embodiment of the present invention.

Notably, the vehicle braking system 29 preferably includes a solenoid switch 50 responsive to the output signal from the logic gate 28. An air valve 51 is communicatively coupled to the solenoid switch 50 and responsive thereto such that the air valve 51 activates the vehicle braking system 29 by permitting air to pass downstream of the air valve 51 and to existing vehicle brake pads 73. In one embodiment, the air valve 51 preferably includes a casing 52 having an inlet port 53 and an outlet port 54 situated downstream from the inlet port 53. A piston 55 may be linearly reciprocated within the casing 52 such that the inlet port 53 is adapted to be in fluid communication with an existing air tank 58 of the vehicle 11. In this manner, the outlet port 54 may be adapted to be in fluid communication with an existing brake pad 59 of the vehicle braking system 29. The use of a solenoid switch 50 in combination with the piston 55 and ports 53, 54 allows the user to effectively overcome the problem of inadvertent air pressure fluctuations within casing 52 during low gear operating conditions.

The piston 55 may have a linear notch 60 formed therein. Such a notch 60 may be linearly reciprocated along a linear path 61 within the casing 52 such that the notch 60 becomes selectively isolated and accessible to the outlet port 54 when the vehicle braking system 29 is deactivated and activated respectively.

In one embodiment, the air valve is a direct air valve 51 independently operable from the existing brake pedal 63 of the vehicle 11, as best shown in FIG. 4.

Figure 5:
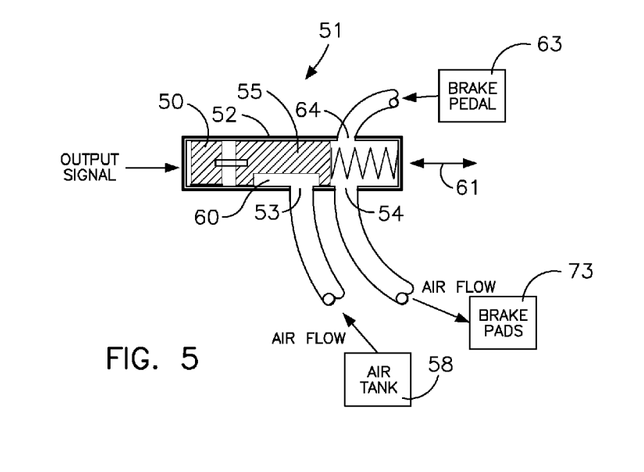
FIGS. 5 and 6 are side elevation views of a bypass air valve used in combination with a brake pedal of an existing vehicle, in accordance with another embodiment of the present invention.
Figure 6:
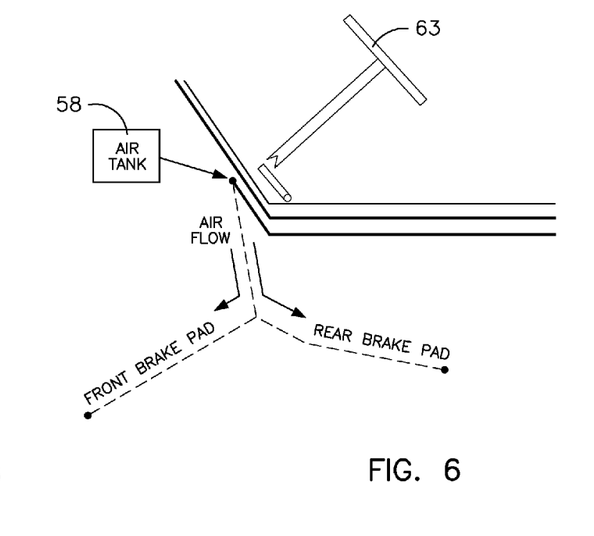

In one embodiment, the air valve is a bypass air valve 51' preferably including a second inlet port 64 in fluid communication with the casing 52 and operably coupled to the existing brake pedal 63 of the vehicle 11 such that air is prohibited and permitted to enter the casing 52 when the piston 55 is at a fully displaced and a fully retracted position within the casing 52, respectively. In this manner, the piston 55 isolates the second inlet port 64 from the outlet port 54 when the piston 55 is fully displaced within the casing 52 such that the vehicle braking system 29 automatically overrides a user input at the existing brake pedal 63. The combination of such claimed elements provides an unpredictable and unexpected result which is not rendered obvious by one skilled in the art because the user is prohibited from actuating the brake system 29 via the brake pedal 63 when the piston 55 isolates the second inlet port 64 from the outlet port 54. This is solves the problem of inadvertently toggling the brake system 29 by a manual user input via the brake pedal 63 when the present invention is detects the triggering event.

The present invention further includes a method of utilizing an automatic vehicle braking system 29 for prohibiting vehicle propulsion upon detection of a triggering event occurring adjacent to vehicle 11. Such a method preferably includes the chronological steps of: providing and attaching a plurality of sensors 20 adapted to alternate positions of the vehicle 11; each of the sensors 20 generating and transmitting an object signal upon detecting the triggering event; providing and electrically coupling a processor 23 directly to the sensors 20; and providing and electrically coupling a memory 25 directly to the processor 23, wherein the memory 25 including software instructions causing the processor 23 to generate a first input signal upon receiving the object signals from the sensors 20. The combination of such claimed elements provides an unpredictable and unexpected result which is not rendered obvious by one skilled in the art, as explained hereinabove.

The method may further include the chronological steps of: providing and electrically coupling a logic gate 28 directly to the processor 23; providing and electrically coupling a vehicle braking system 29 directly to the logic gate 28; the vehicle gear sensor 27 generating and transmitting a second input signal upon detecting a real-time gear level of the vehicle 11; providing and electrically coupling a vehicle braking system 29 directly to the logic gate 28 and being responsive thereto; the logic gate 28 automatically generating an output signal upon receiving the first and second input signals respectively; and the output signal controlling an operating mode of the vehicle braking system 29. The combination of such claimed elements provides an unpredictable and unexpected result which is not rendered obvious by one skilled in the art, as explained hereinabove.

As an example, referring to the figures in general, the system 10 includes electronic mass and motion sensors 20 that may be installed at intervals along the front and rear bumpers of the vehicle 11, as well as a strategic point just forward of the rear wheels. The sensors 20 may operate when the vehicle is traveling at low speeds, and would detect the presence of any foreign object that moved in sight of the sensors 20. If an object is detected by the sensors 20, a signal would immediately be sent to a solenoid which immediately engages the vehicle's brakes as well as sound an audible alarm to warn the driver of the obstruction.

Again referring to the figures, object sensor 21 and object sensor 22 may be electronically coupled to the processor 23 either by hard wire or wirelessly. Also electronically coupled to the processor 23 are the user interface 24, the memory 25, and the vehicle data recorder 26. The vehicle data recorder 26 is communicatively coupled to the vehicle gear sensor 27 which may be communicatively coupled to the logic gate 28. The logic gate 28 receives two input signals from the processor 23 and the vehicle gear sensor 27 respectively. Such input signals indicate whether the vehicle gear sensor 27 is engaged or disengaged, for example.

The logic gate 28 generates output signals based upon a Boolean logic such as "on" and "off" or "true" and "false", which have high and low voltage levels respectively. The input signals of the logic gate 28 are driven by voltages having two nominal values, e.g. 0V and 5V representing logic 0 and logic 1 respectively. The output signals of the logic gate 28 provide two nominal values of voltage only, e.g. 0V and 5V representing logic 0 and logic 1, respectively. The combination of the input signals determines whether the corresponding output signal from the logic gate 28 is "true" or "false". In one example, the logic gate 28 may be combined to form a digital circuit made from various electronic components such as transistors, impedances, capacitances, and other such devices. Finally, the logic gate 28 may preferably be electronically coupled to the vehicle brake system 29.

In one embodiment, the system 10 may have sensors 20 under the bus approximately 3 ft to 4 ft in front of the rear wheels as well as on or below the front bumper, when a child or some foreign object walks, falls, or is pushed under the bus, or walks in front of the bus a flashing light and buzzer alerts the driver while a signal is sent to the computer and immediately engages the brakes, preventing the bus from moving. The quick reaction time of the system 10 acts immediately to stop the bus before the driver is aware that a child is under the bus, saving the child form being run over. The same principle applies at the front of the bus to prevent an accident if a child or some other object moved in front of the bus. The system 10 would be active when the bus is picking up or dropping off children and for a short time after the bus drives away. The motion sensor braking system 10 would be in use when the bus is operated at low speeds, 0-10 mph and would be disabled once the bus reaches speeds greater than 10 mph.

In an alternate embodiment, the system 10 could be used with an automobile or sports utility vehicle (SUV), by alerting the user when he or she is driving too close to another vehicle at high speeds. The system 10 can also be employed to prevent accidents at stop lights or in bumper to bumper traffic. In this manner, the system 10 not only prevents accidents involving children at play, but also accidents between other vehicles or objects. This will greatly reduce the number of insurance and medical claims that result from traffic accidents. The system 10 used on passenger vehicles works just like that on the bus. Motion sensors 20 on the front and rear bumpers send signals to the computer which immediately engage the brakes.

Other embodiments of the motion sensor braking system 10 could be designed for vehicles equipped with air brakes or drum and/or disc brakes. Alternate embodiments will be made for commercial vehicles like tractor-trailers or large delivery vans. On these larger vehicles, the system 10 would have sensors on front and rear bumpers, as well as, underneath the vehicle in front if the rear tires. Again, when a foreign object is detected, a signal will be sent to the computer which will engage the brakes and sound an alarm to alert the driver.

In use, the system is simple and straightforward to operate. The sensors would be placed on the front and rear bumpers, as well as underneath the vehicle, just forward of the rear wheels. The motion sensor braking system would detect any foreign object that moves into the sensor's sights. When the sensors detect an object, a signal is relayed to an on-board computer that engages the vehicle's brakes and an audible alarm is sounded to alert the driver. The system would only be active when the vehicle is in low gear or reverse because it would be dangerous for the brakes to engage when moving at high speeds.

Additionally, the system could be turned off, via a switch on the dashboard, when the vehicle is in a situation that requires close proximity to other vehicles, such as parallel parking. The dashboard switch would allow the system to be turned off for a short duration. The computer would also record when the system is turned off so that if there was an accident, useful information could be gathered as to whether the system was disabled at the time.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automatic vehicle braking system for prohibiting vehicle propulsion upon detection of a triggering event adjacent to a vehicle, said automatic vehicle braking system comprising:
   a plurality of sensors adapted to be attached to the vehicle, each of said sensors generating and transmitting an object signal upon detecting the triggering event;
   a processor communicatively coupled to said sensors;
   a memory communicatively coupled to said processor, said memory including software instructions that cause said processor to generate a first input signal upon receiving said object signals from said sensors;
   a logic gate communicatively coupled to said processor;
   a vehicle gear sensor communicatively coupled to said logic gate, said vehicle gear sensor generating and transmitting a second input signal upon detecting a real-time gear level of the vehicle; and
   a vehicle braking system communicatively coupled to said logic gate and being responsive thereto;
   wherein said logic gate generates an output signal upon receiving said first and second input signals respectively, said output signal controlling an operating mode of said vehicle braking system;
   wherein said vehicle braking system comprises
   a solenoid switch responsive to said output signal from said logic gate; and
   an air valve communicatively coupled to said solenoid switch and being responsive thereto such that said air valve activates the vehicle braking system by permitting air to pass downstream of said air valve and to existing vehicle brake pads;
   wherein said air valve comprises
      a casing having an inlet port and an outlet port situated downstream from said inlet port, and
      a piston linearly reciprocated within said casing, wherein said inlet port is adapted to be in fluid communication with the existing air tank of the vehicle;

wherein said outlet port is adapted to be in fluid communication with an existing brake pad of said vehicle braking system;

wherein said piston has a linear notch formed therein, said notch being linearly reciprocated along a linear path within said casing such that said notch becomes selectively isolated and accessible to said outlet port when said vehicle braking system is deactivated and activated respectively;

wherein said air valve is a bypass air valve comprising
a second inlet port in fluid communication with said casing and adapted to be operably coupled to the existing brake pedal of the vehicle such that air is prohibited and permitted to enter said casing when said piston is at a fully displaced and a fully retracted position within said casing respectively;

wherein said piston isolates said second inlet port from said outlet port when said piston is fully displaced within said casing such that said vehicle braking system automatically overrides a user input at the existing brake pedal.

2. The automatic vehicle braking system of claim 1, wherein said first input signal is true when at least one of said object signals is true, wherein said first input signal is false when both of said object signals are false;
wherein said second input signal is true and false when said real-time gear level of the vehicle is below and above a maximum threshold gear level, respectively.

3. The automatic vehicle braking system of claim 2, wherein said output signal is true when each of said first and second input signals are true, wherein said output signal is false when at least one of said first and second input signals is false;
wherein said vehicle braking system is automatically toggled between activated and deactivated positions when said output signal is true and false respectively.

4. The automatic vehicle braking system of claim 3, further comprising: a user interface communicatively coupled to said processor for manually causing said processor to emit said true or false output signal as desired by the user.

5. The automatic vehicle braking system of claim 4, further comprising: a vehicle data recorder communicatively coupled to said vehicle gear sensor and said processor for recording said first and second input signals during the triggering event.

6. The automatic vehicle braking system of claim 1, wherein said air valve is a direct air valve independently operable from the existing brake pedal of the vehicle.

7. An automatic vehicle braking system for prohibiting vehicle propulsion upon detection of a triggering event adjacent to a vehicle, said automatic vehicle braking system comprising:
a plurality of sensors adapted to be attached to alternate positions of the vehicle, each of said sensors generating and transmitting an object signal upon detecting the triggering event;
a processor electrically coupled directly to said sensors;
a memory electrically coupled directly to said processor, said memory including software instructions that cause said processor to generate a first input signal upon receiving said object signals from said sensors;
a logic gate electrically coupled directly to said processor;
a vehicle gear sensor electrically coupled directly to said logic gate, said vehicle gear sensor generating and transmitting a second input signal upon detecting a real-time gear level of the vehicle; and
a vehicle braking system electrically coupled directly to said logic gate and being responsive thereto;

wherein said logic gate automatically generates an output signal upon receiving said first and second input signals respectively, said output signal controlling an operating mode of said vehicle braking system;

wherein said vehicle braking system comprises:
a solenoid switch responsive to said output signal from said logic gate; and
an air valve communicatively coupled to said solenoid switch and being responsive thereto such that said air valve activates the vehicle braking system by permitting air to pass downstream of said air valve and to existing vehicle brake pads;

wherein said air valve comprises
a casing having an inlet port and an outlet port situated downstream from said inlet port, and
a piston linearly reciprocated within said casing,
wherein said inlet port is adapted to be in fluid communication with the existing air tank of the vehicle;
wherein said outlet port is adapted to be in fluid communication with an existing brake pad of said vehicle braking system;

wherein said piston has a linear notch formed therein, said notch being linearly reciprocated along a linear path within said casing such that said notch becomes selectively isolated and accessible to said outlet port when said vehicle braking system is deactivated and activated respectively;

wherein said air valve is a bypass air valve comprising:
a second inlet port in fluid communication with said casing and adapted to be operably coupled to the existing brake pedal of the vehicle such that air is prohibited and permitted to enter said casing when said piston is at a fully displaced and a fully retracted position within said casing respectively;

wherein said piston isolates said second inlet port from said outlet port when said piston is fully displaced within said casing such that said vehicle braking system automatically overrides a user input at the existing brake pedal.

8. The automatic vehicle braking system of claim 7, wherein said first input signal is true when at least one of said object signals is true, wherein said first input signal is false when both of said object signals are false;
wherein said second input signal is true and false when said real-time gear level of the vehicle is below and above a maximum threshold gear level, respectively.

9. The automatic vehicle braking system of claim 8, wherein said output signal is true when each of said first and second input signals are true, wherein said output signal is false when at least one of said first and second input signals is false;
wherein said vehicle braking system is automatically toggled between activated and deactivated positions when said output signal is true and false respectively.

10. The automatic vehicle braking system of claim 9, further comprising:
a user interface communicatively coupled to said processor for manually causing said processor to emit said true or false output signal as desired by the user.

11. The automatic vehicle braking system of claim 10, further comprising: a vehicle data recorder communicatively coupled to said vehicle gear sensor and said processor for recording said first and second input signals during the triggering event.

12. The automatic vehicle braking system of claim 7, wherein said air valve is a direct air valve independently operable from the existing brake pedal of the vehicle.

* * * * *